US009026776B2

(12) United States Patent
Hamid

(10) Patent No.: US 9,026,776 B2
(45) Date of Patent: *May 5, 2015

(54) PORTABLE DESKTOP DEVICE AND METHOD OF HOST COMPUTER SYSTEM HARDWARE RECOGNITION AND CONFIGURATION

(71) Applicant: Imation Corp., Oakdale, MN (US)

(72) Inventor: Laurence Hamid, Ottawa (CA)

(73) Assignee: Imation Corp., Oakdale, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/958,910

(22) Filed: Aug. 5, 2013

(65) Prior Publication Data

US 2013/0339716 A1    Dec. 19, 2013

Related U.S. Application Data

(63) Continuation of application No. 12/570,608, filed on Sep. 30, 2009, now Pat. No. 8,516,236.

(51) Int. Cl.
  *G06F 9/00*  (2006.01)
  *G06F 21/57*  (2013.01)
  *G06F 9/44*  (2006.01)

(52) U.S. Cl.
  CPC ............ *G06F 21/575* (2013.01); *G06F 9/4411* (2013.01)

(58) Field of Classification Search
  USPC ......................................................... 713/1, 2
  See application file for complete search history.

(56) References Cited

U.S. PATENT DOCUMENTS

| 6,249,868 | B1 | 6/2001 | Sherman et al. |
| 6,321,335 | B1 | 11/2001 | Chu |
| 6,370,649 | B1 | 4/2002 | Angelo et al. |
| 6,718,463 | B1 | 4/2004 | Malik |
| 6,754,817 | B2 | 6/2004 | Khatri et al. |
| 7,069,433 | B1 | 6/2006 | Henry et al. |
| 7,293,166 | B2 | 11/2007 | Nguyen et al. |
| 7,363,363 | B2 | 4/2008 | Dal Canto et al. |
| 7,484,089 | B1 | 1/2009 | Kogen et al. |
| 7,512,512 | B2 | 3/2009 | Foote et al. |

(Continued)

FOREIGN PATENT DOCUMENTS

| EP | 1 168 235 A2 | 1/2002 |
| GB | 2 420 198 A | 5/2006 |

(Continued)

OTHER PUBLICATIONS

Kevin. "Review: IronKey Secure USB Flash Drive," Oct. 3, 2007, p. 1-5. Retrieved from the Internet: <URL: http://www.geek.com/articles/gadgets/review-ironkey-secure-usb- flash-drive-2007103/> retrieved on Nov. 15, 2012.

*Primary Examiner* — Zahid Choudhury
(74) *Attorney, Agent, or Firm* — Dorsey & Whitney, LLP

(57) ABSTRACT

A portable desktop device and method for host computer system hardware recognition and configuration are provided. The portable desktop device causes on a first boot, the host computer system to recognize hardware devices connected thereto, and to configure hardware configuration files of the portable desktop O/S in accordance with the recognized hardware. Once the hardware configuration files have been configured, the system is rebooted. On the second boot, the host computer determines that the portable desktop has been configured for its hardware, and initiates start-up of the portable desktop.

20 Claims, 2 Drawing Sheets

(56) References Cited

U.S. PATENT DOCUMENTS

| | | |
|---|---|---|
| 7,555,568 B2 | 6/2009 | Huang |
| 7,865,573 B2 | 1/2011 | Tyhurst et al. |
| 7,975,287 B2 | 7/2011 | Hung |
| 8,024,790 B2 | 9/2011 | Zhao et al. |
| 8,065,676 B1 | 11/2011 | Sahai et al. |
| 8,104,088 B2 | 1/2012 | Khilnani et al. |
| 8,140,869 B2 | 3/2012 | Song et al. |
| 8,176,153 B2 | 5/2012 | Bose |
| 2002/0087877 A1 | 7/2002 | Grawrock |
| 2002/0188565 A1 | 12/2002 | Nakamura et al. |
| 2003/0023839 A1* | 1/2003 | Burkhardt et al. ............... 713/1 |
| 2003/0101246 A1 | 5/2003 | Lahti |
| 2003/0195950 A1 | 10/2003 | Huang et al. |
| 2003/0216136 A1 | 11/2003 | McBreaty et al. |
| 2004/0019778 A1 | 1/2004 | Gere |
| 2004/0095382 A1 | 5/2004 | Fisher et al. |
| 2004/0103288 A1 | 5/2004 | Ziv et al. |
| 2005/0193188 A1 | 9/2005 | Huang |
| 2005/0235045 A1 | 10/2005 | Narayanaswami et al. |
| 2006/0080540 A1 | 4/2006 | Arnon et al. |
| 2006/0085845 A1 | 4/2006 | Davis et al. |
| 2006/0130004 A1 | 6/2006 | Hughes et al. |
| 2006/0200679 A1 | 9/2006 | Hawk et al. |
| 2007/0016743 A1 | 1/2007 | Jevans |
| 2007/0101118 A1 | 5/2007 | Raghunath et al. |
| 2007/0143837 A1 | 6/2007 | Azeez et al. |
| 2007/0300220 A1 | 12/2007 | Seliger et al. |
| 2008/0016005 A1 | 1/2008 | Owen et al. |
| 2008/0022393 A1 | 1/2008 | Waltermann et al. |
| 2008/0052528 A1 | 2/2008 | Poo et al. |
| 2008/0052770 A1 | 2/2008 | Ali et al. |
| 2008/0052776 A1 | 2/2008 | Prabhat et al. |
| 2008/0072289 A1 | 3/2008 | Aoki et al. |
| 2008/0172555 A1 | 7/2008 | Keenan |
| 2008/0215796 A1 | 9/2008 | Lam et al. |
| 2008/0293450 A1 | 11/2008 | Ryan et al. |
| 2009/0049307 A1 | 2/2009 | Lin |
| 2009/0132816 A1 | 5/2009 | Lee |
| 2009/0210794 A1 | 8/2009 | Pendse et al. |
| 2009/0260071 A1 | 10/2009 | Sadovsky et al. |
| 2009/0300710 A1 | 12/2009 | Chai et al. |
| 2009/0319782 A1 | 12/2009 | Lee |
| 2010/0036973 A1 | 2/2010 | Mardiks et al. |
| 2010/0098243 A1 | 4/2010 | Chopart |
| 2010/0251328 A1 | 9/2010 | Syed et al. |
| 2011/0078347 A1 | 3/2011 | Hamid |
| 2011/0078428 A1 | 3/2011 | Hamid |
| 2011/0078785 A1 | 3/2011 | Hamid |
| 2011/0078787 A1 | 3/2011 | Hamid |

FOREIGN PATENT DOCUMENTS

| | | |
|---|---|---|
| WO | WO 98/04967 A1 | 2/1998 |
| WO | WO 2008/122755 A1 | 10/2008 |
| WO | WO 2011/038502 | 4/2011 |
| WO | WO 2011/038503 | 4/2011 |
| WO | WO 2011/038504 | 4/2011 |
| WO | WO 2011/038505 | 4/2011 |
| WO | WO 2011/057409 | 5/2011 |

* cited by examiner

PORTABLE DESKTOP DEVICE AND METHOD OF HOST COMPUTER SYSTEM HARDWARE RECOGNITION AND CONFIGURATION

This application claims priority to and is a continuation of U.S. patent application Ser. No. 12/570,608, filed Sep. 30, 2009, issuing under U.S. Pat. No. 8,516,236, the entirety of which is hereby incorporated by reference.

FIELD OF THE INVENTION

The invention relates to portable desktops, and more particularly to the recognition and configuration of hardware on the host of the portable desktop.

BACKGROUND OF THE INVENTION

A portable desktop allows a user to utilize the hardware of a host computer system and thus provides a portable computing environment. A portable desktop may be physically embodied in portable storage media and more often is embodied in a portable device which includes processing hardware, storage, and input/output (I/O) hardware for communication with the host system and/or authentication by a user. The portable computing environment, hereinafter referred to as the portable desktop, is portable in the sense that any changes made to data files, software, settings, user preferences, or any other configuration or aspect of that computing environment made during a session on the host computer system, which are intended to be permanent, are stored in the portable device such that the portable desktop has continuity across multiple sessions. The appearance, functionality, content and/or configuration of the portable desktop should also be independent of any changes made to any particular host computer system as well as be independent of the particular host computer system used for any session. Portability, therefore, depends upon the ability of the portable desktop device to function with as many different host computer systems as possible independent of the software, operating system (O/S), or particular hardware possessed by the host computer system.

Depending upon the use of the portable desktop device, different considerations become more or less important in its configuration and capability. Individual users who use their portable desktop for functionality and data which are not sensitive nor give rise to security concerns will be more interested in broad compatibility with multiple systems at the expense of security. In the case of portable desktop devices which are deployed amongst members of an organization and if the functionality and/or data to be possessed by the portable desktop devices is particularly sensitive and/or must meet certain security protocols, it may be preferable that the portable desktop device be secure at the expense of compatibility with multiple systems.

Considerations for both portability and security are important in determining how a portable desktop device is to function with the hardware environment of its host computer system. Known approaches in addressing the needs of individuals and organizations utilizing portable desktop devices have merely offered a range of options falling within a portability versus security spectrum consistent with the idea that in order to have one of portability or security one must do so at the expense of the other.

One known approach falling at the security end of the spectrum limits the portable desktop device to function on identical systems only. The portable desktop device is configured such that it will only function with a host computer system having a computer configuration identical to a particular pre-defined computer configuration. This approach allows an administrator of an organization possessing sensitive data and/or programs to control exactly what kind of systems the portable desktop device will work with. Such an approach may also use some sort of system authentication to determine in addition to a kind of computer configuration, the identity of the host computer system in order to prevent the portable desktop device from functioning on any system which is not within the control of the administrator. This approach would be recommended for defense or law enforcement organizations. Unfortunately, although control and security are maintained, this renders the portable desktop device extremely limited in its portability.

Another known approach closer to the portability end of the spectrum restricts operation of hardware devices on the host computer system such that only standard devices may operate in the hardware environment supporting the portable desktop device during operation. According to such an approach, the portable desktop O/S loads standard configuration and drivers and only devices supporting these are operable and only in accordance with the standard functions of those devices. In this approach, although the portable desktop device would generally be portable across computer systems having standard driver compatible hardware, security risks associated with the operation of the hardware devices depend upon the security of the hardware devices themselves and the standard drivers being used therewith. The functionality and usefulness of the portable desktop will also be inherently limited to the standard functionality supported by the standard drivers and as such, any specialized hardware will be limited to rudimentary functioning or may not function at all.

Another known approach leaves both considerations of portability and security to the user by allowing a local operating system of the host computer system to execute the portable desktop. The security of the portable desktop is then only as secure as the local operating system its hardware and device drivers, rendering the portable desktop unsuitable for any applications requiring more security than the host computer system. As such a user of this kind of portable desktop device must know the security level of the local operating system and hardware and drivers of the host computer system or must be prepared to take the risk of using the portable desktop device in an unknown host computer system.

It would be advantageous for there to be a method or system for portable desktops that enhances portability and/or security and overcomes some limitations of known portable desktop approaches.

SUMMARY OF THE INVENTION

According to one aspect, the invention provides for a method of host computer system hardware recognition and configuration for a portable desktop device connected to the host computer system, the method comprising: on a first boot of the host computer system from the portable desktop device: recognizing at least one hardware device connected to the host computer system; configuring at least one hardware configuration file of a portable desktop O/S of the portable desktop device in accordance with the recognized hardware devices; and rebooting the host computer system; on a second boot of the host computer system from the portable desktop device: starting up the portable desktop O/S using the configured at least one hardware configuration file.

According to another aspect, the invention provides for a portable desktop device comprising: I/O hardware for coupling the portable desktop device to a host computer system, the host computer system connected to at least one hardware device; memory storage comprising: a portable desktop storage block comprising a portable desktop O/S; and a boot process block for execution by the host computer system, and on a first boot of the host computer system from the portable desktop device: a hardware recognition and configuration process block of the boot process block for causing the host computer system to: recognize the at least one hardware device connected to the host computer system; and configure at least one hardware configuration file of the portable desktop O/S in accordance with the recognized hardware devices, the boot process block for causing the host computer system to reboot itself once the host computer system has finished recognizing the at least one hardware device and configuring the at least one hardware configuration file, and on a second boot of the host computer system, the boot process block for causing the host computer system to initiate starting up the portable desktop O/S using the configured at least one hardware configuration file.

According to a further aspect, the invention provides for a method of host computer system hardware recognition and configuration for a portable desktop device coupled with the host computer system, the method comprising: on a first boot of the host computer system from the portable desktop device: recognizing at least one hardware device connected to the host computer system, copying at least one hardware configuration file to a portable desktop O/S of the portable desktop device in accordance with the recognized hardware devices, and rebooting the host computer system; and, on a second boot of the host computer system from the portable desktop device: starting up the portable desktop O/S using the copied at least one hardware configuration file.

According to yet another aspect, the invention provides for portable desktop device comprising: I/O hardware for coupling the portable desktop device to a host computer system, the host computer system connected to at least one hardware device; memory storage comprising: a portable desktop storage block comprising a portable desktop O/S; and a boot process block for execution by the host computer system, and on a first boot of the host computer system from the portable desktop device: a hardware recognition and configuration process block of the boot process block for causing the host computer system to: recognize the at least one hardware device connected to the host computer system; and copy at least one hardware configuration file to the portable desktop O/S in accordance with the recognized hardware devices, the boot process block for causing the host computer system to reboot itself once the host computer system has finished recognizing the at least one hardware device and copying the at least one hardware configuration file, and on a second boot of the host computer system, the boot process block for causing the host computer system to initiate starting up the portable desktop O/S using the copied at least one hardware configuration file.

In some embodiments, the invention provides for storing hardware configuration information for hardware devices of the host computer system during a first session of the portable desktop device with the host computer system which failed a hardware recognition and configuration process, identifying at a known system, hardware configuration files which support the hardware devices and updating the hardware recognition and configuration process of the portable desktop device therewith, whereby on a second session of the portable desktop device with the host computer system, the hardware recognition and configuration process succeeds.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
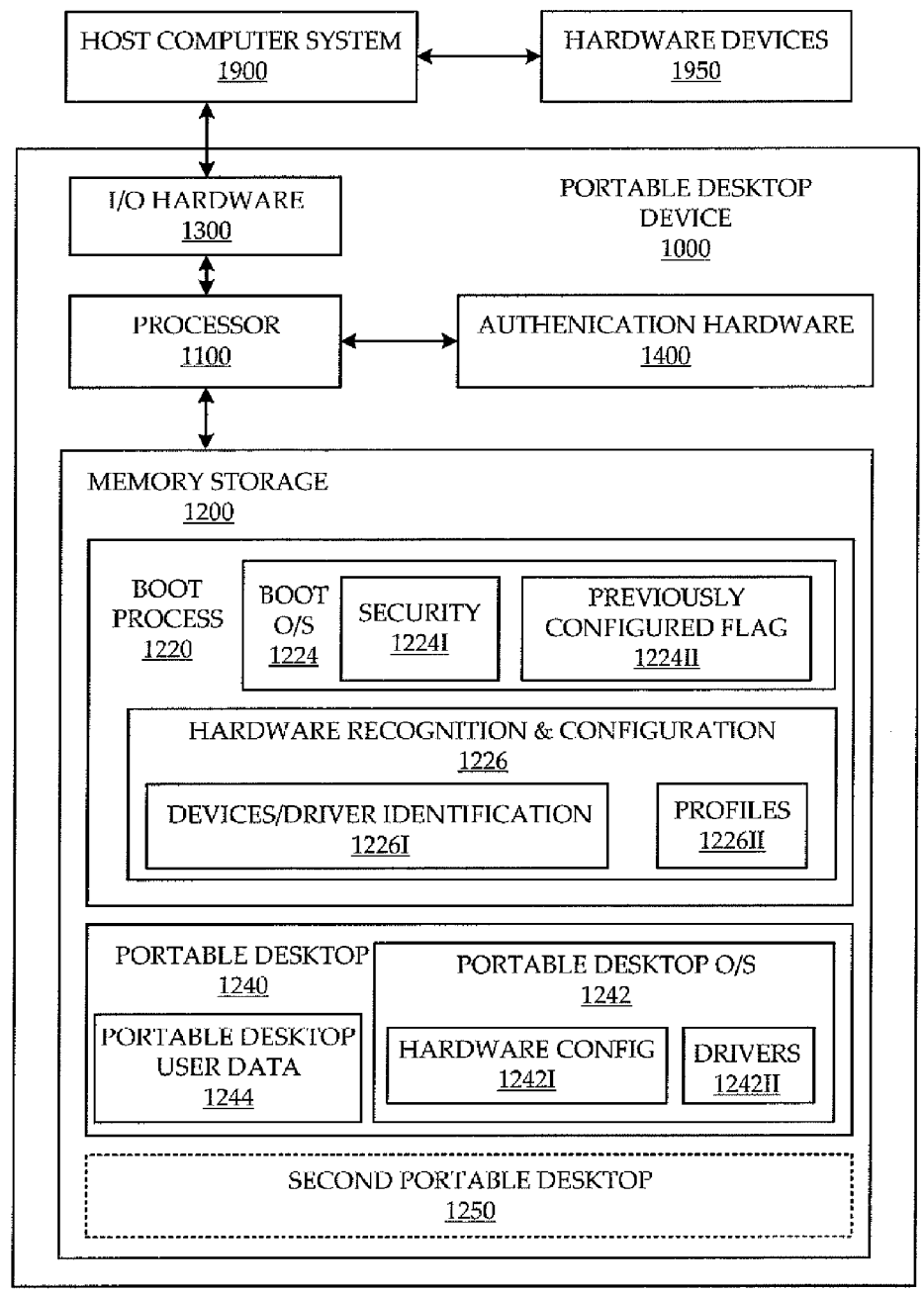
FIG. 1 is a block diagram illustrating a portable desktop device according to an embodiment of the invention and its host computer system and associated hardware devices.

Referring to FIG. 1, a portable desktop device 1000 according to an embodiment of the invention will now be discussed in terms of structure.

The portable desktop device 1000 is shown connected to its host computer system 1900. The host computer system 1900 is coupled to a number of hardware devices 1950. Some of the hardware devices 1950 are external to the host computer system 1900 while others are internal hardware devices. For the purposes of the invention, no distinction is made between an external or an internal hardware device, and as such hardware devices 1950 includes any and all hardware connected to and controlled by the host computer system 1900.

The host computer system 1900 is any computer system capable of interfacing with the portable desktop device 1000. The portable desktop device 1000 may be in the form of any peripheral device capable of interfacing with the host computer system 1900 and in some embodiments is a universal serial bus (USB) storage and processing device.

The portable desktop device 1000 is connected to the host computer system 1900 by input/output (I/O) hardware 1300. In addition to I/O hardware 1300, the portable desktop device 1000 comprises a processor 1100, authentication hardware 1400, and memory storage 1200. The processor 1100 is coupled to the I/O hardware 1300, the authentication hardware 1400, and the memory storage 1200. The authentication hardware 1400 may comprise biometric authentication hardware such as a fingerprint, retinal, or other scanner or may comprise some other input hardware for receiving a bar code, encryption key, combination, password or other authentication information.

The memory storage 1200 comprises a boot process 1220 application data storage block including application storage for a thin boot O/S 1224 in the form of a thin bootable client, including a security process 1224I and a previously configured flag 1224II. The boot process block 1220 also includes a hardware recognition and configuration process block 1226, which includes a devices and driver identification block 1226I and a hardware profiles block 1226II. Memory storage 1200 also comprises a portable desktop storage block 1240. The portable desktop storage block 1240 comprises a portable desktop O/S 1242 including hardware configuration block 1242I and a hardware drivers block 1242II. The portable desktop storage block 1240 also includes a storage block for the portable desktop user data 1244. The portable desktop O/S 1242 may include user data in the form of O/S preferences or configuration settings for a user. The portable desktop user data 1244 may include user installed applications which do not form part of the O/S along with preferences or configuration settings thereof, as well as any other data files associated with the portable desktop the user may have. In embodiments for which multiple users are supported, per user files, preferences or configuration settings are stored in the portable desktop O/S 1242 and multiple instances of portable desktop user data 1244, one for each user, are present in the portable desktop storage block 1240 (not shown). Optionally, in other embodiments, further portable desktop storage blocks are present in the memory storage 1200, each having its own portable desktop O/S and portable desktop user data blocks. This allows for further separation among users and/or groups of users, insuring not only that data and functions of each portable desktop environment are separated but that each user or group of users that can access one portable desktop environment have no knowledge of there being other users who use other desktop environments. A second portable desktop storage block 1250 is shown in dashed lines in FIG. 1.

Figure 2:
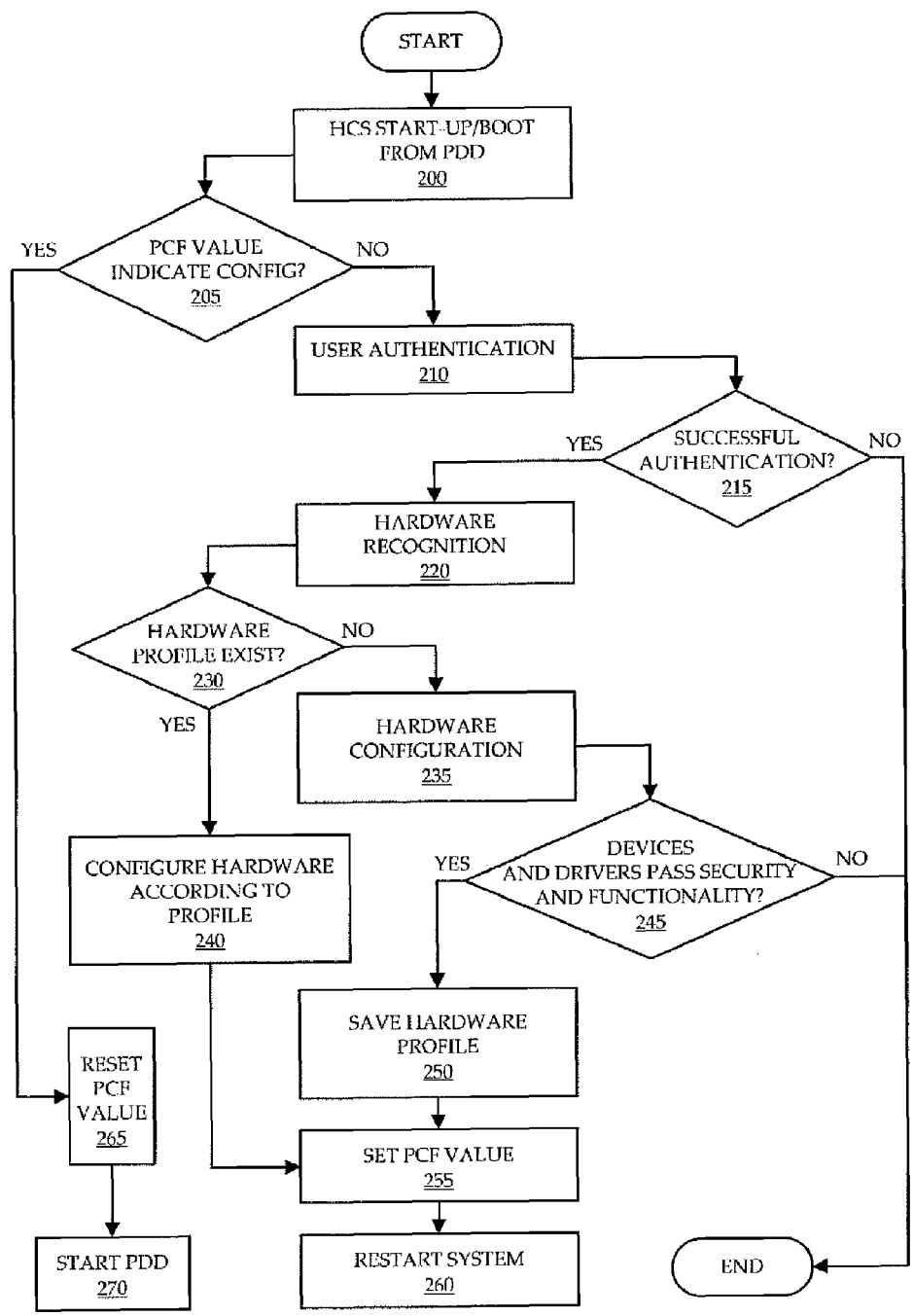
FIG. 2 is a functional block diagram illustrating a method of portable desktop host hardware recognition and configuration.

Referring also to FIG. 2 the portable desktop device 1000 of FIG. 1 will now be described in terms of its functioning in connection with the recognition and configuration of the hardware devices 1950 of the host computer system 1900.

In most embodiments of the invention, in which the portable desktop device 1000 is a USB device, recognition and configuration of the hardware devices 1950 of the host computer system 1900 for use by the portable desktop device 1000 occurs when the host computer system 1900 is turned on and goes through a boot process while the portable desktop device 1000 is connected to the host computer system 1900. Prior to this, a main board or other booting hardware of the host computer system 1900 is configured to boot from the portable desktop device 1000 or is configured to boot from internal and external devices in an order such that when the portable desktop device 1000 is connected to the host computer system 1900 at the time the host computer system 1900 is turned on, the host computer system 1900 (HCS) will boot from the portable desktop device 1000 (PDD) as it does in step 200 of FIG. 2.

In some embodiments, hot-plugging the portable desktop device 1000 will trigger the host computer system 1900 to detect the portable desktop device 1000 and prompt the user to confirm whether or not the system should be restarted in order to commence the portable desktop session.

During a boot of the host computer system 1900 from the portable desktop device 1000, the host computer system 1900 requests, through the I/O hardware 1300, a bootable process, for example the boot process 1220 within application data storage block of the memory storage 1200 and executes the bootable process.

Before responding with a bootable process, the processor on the portable desktop device checks the value of the previously configured flag 1224II (PCF) stored, for example, within the boot O/S 1224 of the boot process 1220 application data storage block as shown in step 205. In some embodiments the previously configured flag resides elsewhere within portable desktop device. If the previously configured flag 1224II has a value indicating that the portable desktop device 1000 has not been configured for the host computer system 1900 which it is connected to, the booting hardware of the host computer system 1900 will execute the boot process 1220. If the previously configured flag 1224II has a value indicating that the portable desktop device 1000 has been configured for the host computer system 1900 which it is connected to, the booting hardware of the host computer system 1900 will reset the previously configured flag 1224II as shown at step 265, and allow startup of the portable desktop as shown in step 270 and as described below.

The boot process 1220 is compatible with the booting hardware of the host computer system 1900. In some embodiments, the boot process 1220 is written in accordance with either the industry standards for IBM PC compatible machines or those of Apple Macintosh machines.

In other embodiments, multiple boot processes are stored within the memory storage 1200, each of which is compatible with a different booting hardware industry standard, to allow operation of the portable desktop device 1000 with various kinds of host computer systems 1900. While executing the boot process 1220 the booting hardware of the host computer system 1900 executes the boot O/S 1224 which is typically a thin bootable but need not be thin.

After determining that the previously configured flag 1224II has a value indicating that the portable desktop device 1000 has not been configured, the booting hardware of the host computer system 1900 executes the boot process 1220 by proceeding to execute the security process 1224I. In embodiments in which the boot O/S 1224 includes the security process 1224I, the full functionality of the boot O/S 1224 is not enabled until the security process 1224I has authenticated use of the boot O/S 1224. Typically, authentication occurs before any data is provided from the portable desktop device to the host computer. In other embodiments the security process 1224I does not form part of the boot O/S 1224, but is instead a separate function within the boot process 1220 to authenticate use of the portable desktop device 1000.

When no data is provided from the portable desktop device to the host computer before authentication occurs, a user knows in advance that they must authenticate to the portable desktop device after power up. Alternatively, when the portable desktop device operates cooperatively with the host computer before authentication, then optionally while executing the security process 1224I, the booting hardware of the host computer system 1900 requests the user to provide user authentication information at step 210. Such a request may be displayed on a monitor connected to the host computer system 1900 which is accessible to the booting hardware in a very basic manner. The user may be requested to provide the user authentication information through the authentication hardware 1400, such as his or her fingerprint or retinal image. As described hereinabove other forms of user authentication information may be provided to the authentication hardware 1400, or provided directly to the host computer system 1900 through some other I/O device such as a keyboard and may comprise a password or code. The manner of requesting user authentication information and the performance of actual authentication of the user is determined by the security process 1224I and will depend on the requirements of the user of or deploying organization of the portable desktop device 1000.

In some embodiments, the security process 1224I executed by the booting hardware of the host computer system 1900 independently makes the request for authentication of the user but invokes the processor 1100 to perform the actual authentication of the user with use of the authentication hardware 1400. In some embodiments, the portable desktop device 1000 provides a connection (not shown) between the I/O hardware 1300 and the authentication hardware 1400 so that the booting hardware of the host computer system 1900 may access the authentication hardware 1400 without invoking the processor 1100. In other embodiments, the security process 1224I causes the booting hardware of the host computer system 1900 to simply invoke security processing by the processor 1100 and wait until the processor 1100 has notified the booting hardware of the host computer system 1900 that the authentication process has completed and whether or not authentication failed or succeeded.

Once user authentication by the security process 1224I has completed, the booting hardware of the host computer system 1900 commences hardware recognition and configuration process 1226 if the authentication was successful and ends the booting process if the authentication was not successful at step 215.

While executing the hardware recognition and configuration process 1226, the booting hardware of the host computer system 1900 performs hardware recognition at step 220 to determine the hardware configuration of the host computer system 1900, identifying all of hardware devices 1950 external and internal to the host computer system 1900 and optionally collecting other available information including for example the status, capability, and configuration of each hardware device of the hardware devices 1950. In some embodiments, the hardware recognition and configuration process 1226 causes the booting hardware to determine whether or not any network interface cards (NICs) are present within the hardware devices 1950, and moreover whether or not any present NICs are connected to any remote systems having a remote driver repository.

In some embodiments, the booting hardware of the host computer system 1900 compares the information gathered during hardware recognition or a code or checksum generated therefrom with similar information stored in a hardware profiles block 1226II at step 230. Alternatively, the hardware recognition and configuration process 1226 performed by the booting hardware of the host computer system 1900 is capable of identifying the host computer system 1900. The hardware profiles block 1226II stores hardware profiles defining previous successfully executed hardware configurations for the portable desktop, and is associated with a respective set of information, code, checksum, or system identification. If the information gathered, code, checksum, or identification during hardware recognition matches the equivalent information stored in the hardware profiles block 1226II, the booting hardware of the host computer system 1900 proceeds at step 240, in accordance with the associated hardware profile, to perform a same configuration of the files within the hardware configuration block 1242I of the portable desktop O/S 1242, as was performed in association with the previously successfully executed hardware configuration of the portable desktop.

The booting hardware of the host computer system 1900 proceeds then with hardware configuration at step 235 if no existing hardware profiles were found. For each hardware device found during hardware recognition, the booting hardware determines whether or not the hardware device is known, an identification of a proper driver for the hardware device, if known whether or not the hardware device or the device driver for the hardware device has any associated security concerns, whether or not the device driver is certified, whether or not the hardware device is unsupported, determining an availability of and identifying a location of the device driver, and creating or modifying files in and/or copying files to the portable desktop O/S 1242 as required.

Some of the files to be created or modified or copied by the booting hardware of the host computer system 1900 while executing the hardware recognition and configuration process 1226, are files residing in hardware configuration block 1242I of the portable desktop O/S 1242. Files in the hardware configuration block 1242I are created, modified, or copied to, in order to ensure that the correct device drivers are set within the startup files of the portable desktop operating system so that the portable desktop 1240 can run and utilize a subset of hardware devices of the hardware devices 1950 of the host computer system 1900. During the hardware recognition and configuration process 1226, the booting hardware of the host computer system 1900 makes the appropriate modifications or additions to files within the hardware configuration block 1242I to enable operation of drivers and devices which meet a set security threshold or specification of the portable desktop device 1000 and to disable operation of drivers and devices which fall below the security threshold or specification. As such, if the booting hardware executing the hardware recognition and configuration process 1226 determines that a hardware device is not known and if the security threshold or specification for the portable desktop device 1000 specifies that all unknown hardware is to be disabled, the files within the hardware configuration block 1242I are changed to ensure this. Likewise, depending upon the security threshold or specification of the portable desktop device 1000, the security concerns for each device or each device driver, whether or not the hardware device is unsupported, whether or not the device driver is certified, and whether or not the device driver is available and how it is available, may cause the device driver or the device to be enabled or disabled or optionally, restricted in use or operation during the portable desktop session.

In a case where it has been determined that the device driver is not located in the hardware drivers block 1242II, and it has been determined that a network interface card having a suitably secure connection to a remote driver repository forms part of the hardware configuration of the host computer system 1900, the booting hardware of the host computer system 1900 during the hardware recognition and configuration process 1226 may obtain the appropriate device driver from the remote repository as long as the security threshold or specification allows it. In this case, the newly obtained device driver is added by the booting hardware of the host computer system 1902 to the hardware drivers block 1242II of the portable desktop O/S 1242.

In some embodiments, and in accordance with the security threshold or specification for the portable desktop device 1000, the hardware configuration block 1242I is modified to ensure that all storage devices of the host computer system and in particular any hard drives of the host computer system are disabled during the portable desktop session. This prevents data from being stored locally on the host computer system, increasing security of the portable desktop and the information it holds, and eliminates the risk of loss of functionality due to changes to the portable desktop being recorded locally in the host computer system 1900 and subsequently being lost when the portable desktop is disconnected from the host computer system 1900.

Once configuration of the files of the hardware configuration block 1242I has been completed, or during the configuration thereof, the booting hardware of the host computer system 1900 checks the hardware configuration for minimal required functionality, according to a threshold stored with the security threshold or specification or in a functionality threshold or specification. This functionality threshold in general would be set to the minimum system requirements for operation of the portable desktop. If the booting hardware of the host computer system 1900 determines that the host computer system 1900 does not have the required hardware functionality, the hardware recognition and configuration process 1226 fails and the boot process 1220 would cease. This would occur, for example, if no interface devices were present within the host computer system 1900, and if the functionality threshold or specification of the portable desktop device 1000 required at least one interface device. The hardware configuration may also fail the functionality threshold if the devices and drivers are present, but due to security concerns, the devices and drivers for the required functionality are disabled. This could occur, for example, if the functionality threshold or specification of the portable desktop device 1000 required at least one interface device, and although many such devices and drivers were present none of the drivers met the security threshold or specification because they were all unsigned.

In some embodiments, no changes are made to the files of the hardware configuration block 1242I and the hardware drivers block 1242II until the hardware configuration has been deemed to pass both the security threshold or specification and the functionality threshold or specification. In other embodiments, a back-up of the files of the hardware configuration block 1242I is made before the changes are made, and if for any reason the hardware recognition and configuration fails, the files of the hardware configuration block 1242I are restored to their earlier form using the back-up.

Optionally, the booting hardware of the host computer system 1900 saves a hardware profile in the hardware profiles block 1226II defining the successful hardware configuration and associating it with the set of information, code, checksum, or system identification discussed above.

Once the configuration of the files of the hardware configuration block 1242I has been configured successfully at step 245, and any new profiles saved at step 250 or once the files of the hardware configuration block 1242I has been configured according to a profile in step 240, the booting hardware of the host computer system 1900 completes execution of the hardware recognition and configuration process 1226 by setting the previously configured flag 1224II to a value indicating that the portable desktop device 1000 has been configured at step 255 and restarting the host computer system 1900 at step 260.

When the host computer system 1900 is restarted, it boots from the portable desktop device 1000, the booting hardware of the host computer system 1900 requests a bootable process 1220. As was mentioned hereinabove, at an early stage in the boot process and the portable desktop device checks the value of the previously configured flag 1224II at step 205. Since the previously configured flag 1224II has been set to a value indicating that the portable desktop device 1000 has been configured, the booting hardware of the portable desktop device resets the value of the previously configured flag 1224II to a value indicating that the portable desktop device 1000 has not been configured at step 265, and initiates startup of the portable desktop (PD) at step 270. The previously configured flag 1224II is reset in order to ensure that the process of hardware recognition and configuration is performed the next time the portable desktop device 1000 is used, as it may be moved to a different system.

Since the files of the hardware configuration block 1242I and possibly the hardware drivers block 1242II have been modified as required, the portable desktop O/S 1242 starts up and operates the subset of hardware devices of the hardware devices 1950 in accordance with the security threshold or specification and the functionality threshold or specification of the portable desktop device 1000.

In some embodiments, during a portable desktop session, the contents of the boot process block 1220 are inaccessible, providing security for the boot process 1220 and ensuring that the security process 1224I is not tampered with.

As will be apparent to any skilled person in the art, the process of recognizing the hardware of the host computer system and configuring the files of the hardware configuration block of the portable desktop O/S makes the subsequent start-up of the portable desktop O/S extremely portable and efficient, since the portable desktop O/S has, in a sense, been custom pre-configured for the host computer system and the particular hardware devices it possesses. It also should be apparent to any skilled person in the art, that performing the process of configuring the files of the hardware configuration block of the portable desktop O/S in accordance with a security threshold or specification ensures a strictly followed level of security for the drivers and devices enabled for use by the portable desktop. As such, instead of portability at the expense of security and vice versa, a portable desktop device 1000 according to the embodiments described hereinabove may be provided with a customizable amount of both portability and security on an as needed basis.

Although the above embodiments contemplate a single memory store for portable desktop data, optionally, when multiple users are supported each different user of the multiple users is within an independent storage area providing optional enhanced security when only that storage area is accessible to the portable desktop. Further optionally, instead of providing the boot process with access to the storage area of the portable desktop, access is provided to a separate hardware configuration storage area that is also accessible to the portable desktop application. In this fashion, the portable desktop can optionally be prevented from modifying the hardware configuration and the boot process is prevented from accessing the portable desktop data.

When security and control over portability are of significant concern, optionally the configuration information for the hardware is retrieved during a first session, and in a case that the configuration failed, a log or record of the failure is also stored. Thereafter, an IT department or a server local to a network and known, is used to identify from the configuration information the necessary hardware configuration files or modifications thereto, or alternatively generates or obtains the necessary hardware configuration files, including drivers, etc. and updates/stores them in the devices/driver identification block 1226I and/or the hardware profiles block 1226II of the hardware recognition and configuration process block 1226 of the portable desktop device 1000. During a subsequent second session, the portable desktop device 1000 supports, with use of the modified or additional hardware configuration files, operation of its portable desktop environment on the host computer system 1900. In such an embodiment, the portable desktop device 1000 may not support operation of the portable desktop environment the first time it is used with a given host computer system. That said, after configuration by the IT department or known and local system, it will then support operation of the portable desktop environment. This provides an IT department, for example, with additional control over where and how the portable desktop device is used.

The embodiments presented are exemplary only and persons skilled in the art would appreciate that variations to the embodiments described above may be made without departing from the spirit of the invention. The scope of the invention is defined by the appended claims.

What is claimed is:

1. A portable desktop device having a security specification, the device comprising:
   hardware for coupling to a host system connected to a number of hardware devices; and
   memory storage comprising:
      a portable desktop storage block with a portable desktop operating system for execution on the host system;
      a configuration block for execution on a first boot of the host system, wherein the host system recognizes at least one of the hardware devices and configures at least one hardware configuration file in the memory storage, in accordance with the at least one recognized hardware device; and a boot process block for execution by the host system, wherein:

on the first boot, the host system sets a previously configured flag indicating that the portable desktop device is other than configured to a value indicating that the portable desktop device has been configured;

the host system reboots to execute the portable desktop operating system on a second boot of the host system, wherein hardware devices which meet the security specification are enabled and hardware devices which fall below the security specification are disabled, based on the at least one hardware configuration file; and on the second boot of the host system, the host system resets the previously configured flag to the value indicating that the portable desktop device is other than configured.

2. The device of claim 1, further comprising a processor on the portable desktop device, wherein the host system invokes a security process on the processor for authentication of a user of the portable desktop device.

3. The device of claim 2, further comprising authentication hardware on the portable desktop device for the authentication of the user, wherein the security process is configured to notify the host system whether the authentication has failed or succeeded.

4. The device of claim 1, wherein the at least one recognized hardware device comprises a hard drive and the configuration block is configured to disable the hard drive, in accordance with the security specification.

5. The device of claim 1, wherein the configuration block is configured to restrict operation of at least one of the hardware devices based on a security concern, in accordance with the security specification.

6. The device of claim 5, wherein the security concern comprises the at least one disabled hardware device being unknown or a hardware driver for the at least one disabled hardware device being uncertified, unavailable or unsupported.

7. The device of claim 1, further comprising a second portable desktop storage block in the memory storage, each of the portable desktop storage blocks having its own portable desktop operating system for operating separate portable desktop environments on the host system.

8. The device of claim 7, wherein users of each portable desktop environment are separated, such that each user can access one of the portable desktop environments without knowledge of other such portable desktop environments.

9. A method of operating a host computer with a portable desktop device having a security specification, the method comprising:

on a first boot of the host computer from the portable desktop device:

recognizing a number of hardware devices connected to the host computer;

configuring a hardware configuration file for a portable desktop operating system stored in memory of the portable desktop device, in accordance with the recognized hardware devices; and setting a flag indicating that the portable desktop device is other than configured to a value indicating that the portable desktop device has been configured;

rebooting the host computer to execute the portable desktop operating system for operation of a portable desktop environment on a second boot from the portable desktop device; and on the second boot of the host computer from the portable desktop device:

operating a subset of the recognized hardware devices in the portable desktop environment, wherein operation of at least one hardware device that meets the security specification is enabled and operation of at least one hardware device that falls below the security specification is restricted, based on the hardware configuration file; and resetting the flag to indicate that the portable desktop device is other than configured.

10. The method of claim 9, further comprising disabling any hard drives of the host computer during operation of the portable desktop environment on the host computer.

11. The method of claim 9, further comprising determining whether any of the recognized hardware devices has a security concern, wherein operation of at least one such hardware device is restricted based on the security concern.

12. The method of claim 11, wherein the security concern comprises the at least one such hardware device being unknown.

13. The method of claim 11, wherein the security concern comprises a hardware driver for the at least one such hardware device being uncertified, unavailable or unsupported by the desktop environment.

14. The method of claim 9, wherein operating the subset of the recognized hardware devices comprises disabling operation of the at least such one hardware device.

15. The method of claim 9, further comprising checking the hardware configuration file for minimal functionality according to a threshold stored with the security specification.

16. The method of claim 15, further comprising ceasing recognizing the hardware devices in a case where the host computer has other than the minimal functionality.

17. The method of claim 9, further comprising invoking a security process for authentication of a user of the portable desktop device, wherein the host computer invokes the security process for execution on the portable desktop device and the security process notifies the host computer whether the authentication has succeeded.

18. A portable storage device comprising a non-transitory computer-readable storage medium having program data stored thereon, the program data executable on a host processor to perform a method comprising:

recognizing a number of hardware devices connected to the host processor;

configuring a hardware configuration file for a portable desktop operating system stored in memory of the portable storage device, in accordance with the recognized hardware devices;

setting a flag indicating that the portable storage device is other than configured to a value indicating that the portable storage device has been configured;

rebooting the host processor to execute the portable desktop operating system for operation of a portable desktop environment on the host processor;

enabling operation of at least one of the recognized hardware devices that meets a security specification for the portable storage device, based on the hardware configuration file;

restricting operation of at least one of the recognized hardware devices that falls below the security specification, based on the hardware configuration file; and resetting the flag to indicate that the portable storage device is other than configured.

19. The device of claim 18, the method further comprising disabling operation of at least one of the recognized hardware devices that falls below the security specification, based on the hardware configuration file.

20. The device of claim 18, the method further comprising disabling a hard drive of the host processor during operation of the portable desktop environment, in accordance with the security specification.

\* \* \* \* \*